(12) United States Patent  
Ueki

(10) Patent No.: US 8,848,227 B2  
(45) Date of Patent: Sep. 30, 2014

(54) JOB DIVISION APPARATUS

(71) Applicant: Riso Kagaku Corporation, Tokyo (JP)

(72) Inventor: Toshiyuki Ueki, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 68 days.

(21) Appl. No.: 13/668,648

(22) Filed: Nov. 5, 2012

(65) Prior Publication Data

US 2013/0120792 A1    May 16, 2013

(30) Foreign Application Priority Data

Nov. 11, 2011    (JP) ................................. 2011-247359

(51) Int. Cl.
    *G06F 3/12*    (2006.01)
(52) U.S. Cl.
    CPC ....................................... *G06F 3/12* (2013.01)
    USPC ........................................ 358/1.15; 358/1.18
(58) Field of Classification Search
    USPC ................... 358/1.15, 1.1, 1.16, 1.18, 1.17
    See application file for complete search history.

(56) References Cited

U.S. PATENT DOCUMENTS

| | | | |
|---|---|---|---|
| 8,619,312 B2* | 12/2013 | Mizuguchi | 358/1.17 |
| 2006/0187484 A1* | 8/2006 | Noda | 358/1.15 |
| 2007/0002370 A1* | 1/2007 | Shibata | 358/1.15 |
| 2009/0051947 A1* | 2/2009 | Kuroshima | 358/1.9 |
| 2010/0091311 A1* | 4/2010 | Sato et al. | 358/1.12 |
| 2011/0109930 A1* | 5/2011 | Eom et al. | 358/1.13 |
| 2011/0170132 A1* | 7/2011 | Mori | 358/1.15 |
| 2011/0176165 A1* | 7/2011 | Shiba et al. | 358/1.15 |
| 2012/0300255 A1* | 11/2012 | Hara et al. | 358/1.15 |
| 2013/0062935 A1* | 3/2013 | Cahill et al. | 303/20 |
| 2013/0114106 A1* | 5/2013 | Sato | 358/1.15 |

FOREIGN PATENT DOCUMENTS

JP    09-026863 A    1/1997

* cited by examiner

*Primary Examiner* — Jerome Grant, II
(74) *Attorney, Agent, or Firm* — Nath, Goldberg & Meyer; Jerald L. Meyer

(57) ABSTRACT

A job division apparatus for dividing a print job including a plurality of print sets which are units to be processed by respective image forming apparatuses and transmitting the print sets to the image forming apparatuses. The job division apparatus includes a judgment unit configured to judge whether the print job is dividable at a planned division position indicating a position at which the print job is planned to be divided, on a basis of the planned division position and a set separation position for the print sets included in the print job, a calculator configured to calculate a division position by moving the planned division position so as to agree with the set separation position upon judgment that the print job is not dividable, and a divider configured to divide the print job on a basis of the division position as calculated.

6 Claims, 5 Drawing Sheets

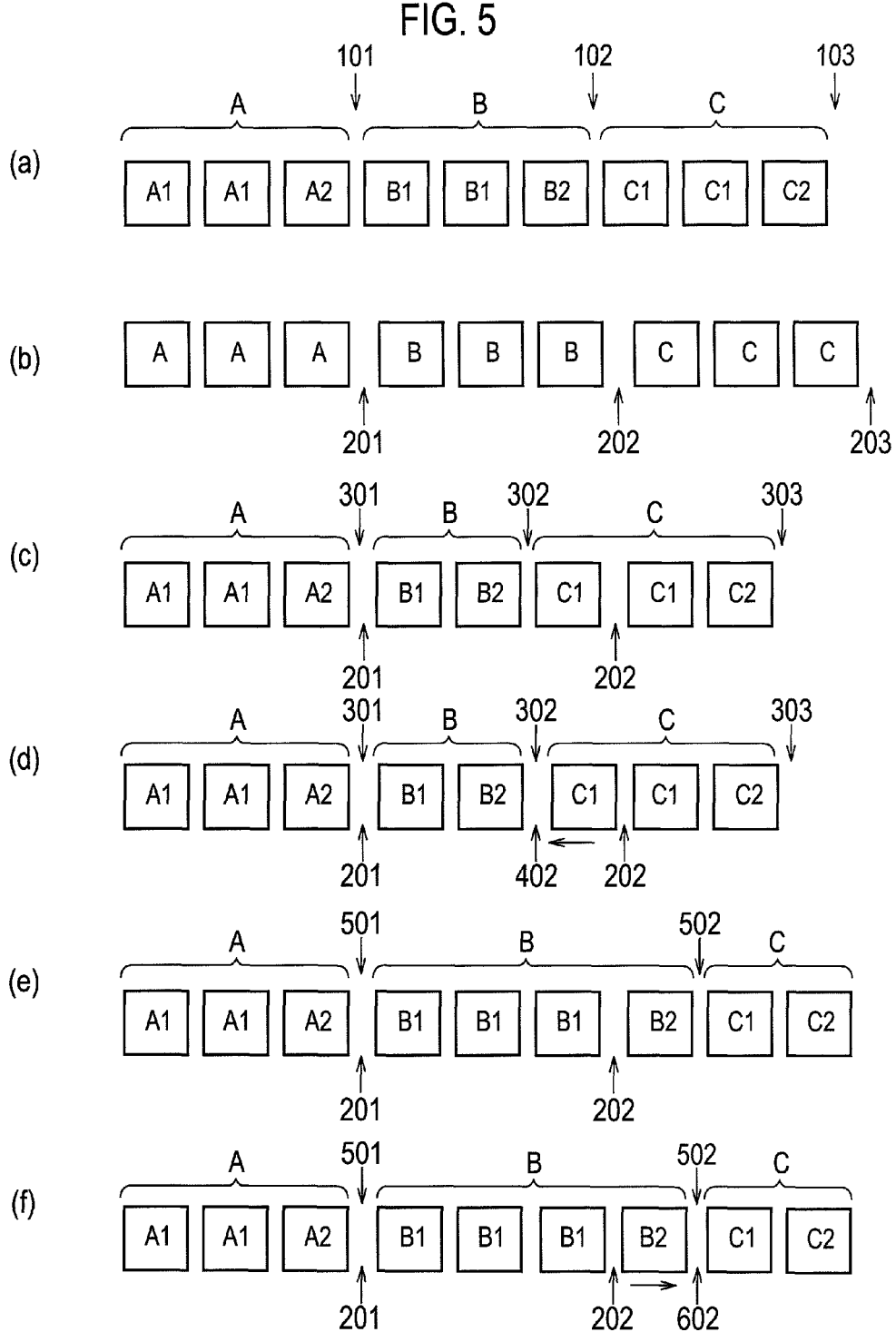

JOB DIVISION APPARATUS

CROSS REFERENCE TO RELATED APPLICATION

This application is based upon and claims the benefit of priority from the prior Japanese Patent Application No. 2011-247359, filed on Nov. 11, 2011, the entire contents of which are incorporated herein by reference.

BACKGROUND

1. Technical Field

This disclosure relates to a job controller to which multiple image forming apparatuses are connected, and particularly to a job division apparatus configured to appropriately divide a print job for each image forming apparatus.

2. Related Art

There exists an image forming system which includes: a terminal configured to generate a print job; and an image forming apparatus connected to this terminal through a network, and configured to carry out various processes on the basis of the print job transmitted from the terminal.

This image forming apparatus includes: a printing section configured to carry out a printing process on the basis of the print job; and a post-processing section connected to this printing section, and configured to carry out post-processes such as an enclosing/sealing process. In some cases, the image forming system includes multiple image forming apparatuses which are connected to the terminal through the network.

In some cases of the image forming system including the multiple image forming apparatuses, the print job is divided so that the divided parts of the print job are processed by the respective multiple image forming apparatuses, for the purpose of dispersing the load.

Japanese Patent Application Publication No. Hei 9-26863 has proposed an information processor in which: font resource information is acquired from a printer connected to a network; on the basis of the acquired font resource information, candidate printing apparatuses are determined for print information to be printed with specified fonts; and on the basis of the number of candidate printing apparatuses thus determined, a LAN controller distributes and transfers equal numbers of pages into which the print information is divided to the determined candidate printing apparatuses.

SUMMARY

In this respect, in some cases, the print job includes multiple print sets which are units to be processed by the printing apparatuses. For example, in a case where each image forming apparatus includes the printing section as well as an enclosing/sealing section configured to enclose content matters, on which the printing section performs printing, into the respective envelopes on which the printing section performs printing and to subsequently seal the envelope, the combination of the content matters to be enclosed into the respective envelopes with the envelopes to be subsequently sealed is treated as one print set.

In the case where, as described above, multiple print sets are included in a print job, the use of the technology for the information processor described in Japanese Patent Application Publication No. Hei 9-26863 sometimes causes situations such as a situation where envelopes and content matters are outputted into different image forming apparatuses because positions by which the print job is divided into equal numbers of pages are situated in the middle of the print sets.

An object of the present invention is to propose a job division apparatus capable of appropriately dividing a print job for each image forming apparatus.

A job division apparatus in accordance with some embodiments is connected to a plurality of image forming apparatuses, configured to divide a print job including a plurality of print sets which are units to be processed by the plurality of respective image forming apparatuses, and configured to transmit the print sets to the plurality of respective image forming apparatuses. The job division apparatus includes a judgment unit configured to judge whether the print job is dividable at a planned division position indicating a position at which the print job is planned to be divided, on a basis of the planned division position and a set separation position for the print sets included in the print job, a calculator configured to calculate a division position by moving the planned division position so as to agree with the set separation position upon judgment by the judgment unit that the print job is not dividable at the planned division position, and a divider configured to divide the print job on a basis of the division position as calculated by the calculator.

In the foregoing constitution, the print job can be appropriately divided for each image forming apparatus because of the following reason. If the judgment unit configured to judge whether or not the print job can be divided judges that the print job cannot be divided on the basis of the planned division position indicating the position at which the print job is planned to be divided and the set separation position for the print sets included in the print job, the division position is calculated by moving the planned division position so that the planned division position can agree with the set separation position.

The job division apparatus may further include a planned-number-by division calculator configured to calculate the planned division position on a basis of a planned number by division obtained by dividing a total number of pages included in the print job by a number of image forming apparatuses connected to the job division apparatus.

The foregoing constitution further includes the planned-number-by-division calculator configured to calculate the planned division positions on the basis of the planned number by division which is obtained by dividing the total number of pages included in the print job by the number of image forming apparatuses connected. For this reason, the print job can be appropriately divided without the user having to set the planned number by division.

BRIEF DESCRIPTION OF DRAWINGS

FIG. 2 is an explanatory diagram for explaining how the image forming apparatus of the image forming system of the embodiment of the present invention makes content matter sheets and the like.

FIGS. 5(*a*) to 5(*f*) are diagrams for schematically explaining a procedure in which the job division apparatus of the image forming system of the embodiment of the present invention performs a division process; FIG. 5(a) is a diagram showing a print job which is received from a terminal; FIG. 5(b) is a diagram showing predetermined planned division positions; FIG. 5(c) is a diagram showing planned division positions and set separation positions; FIG. 5(d) is a diagram for explaining how one of the planned division positions is moved forwards; FIG. 5(e) is a diagram showing planned division positions and set separation positions; and FIG. 5(f) is a diagram for explaining how one of the planned division positions is moved backwards.

DETAILED DESCRIPTION

Figure 1:
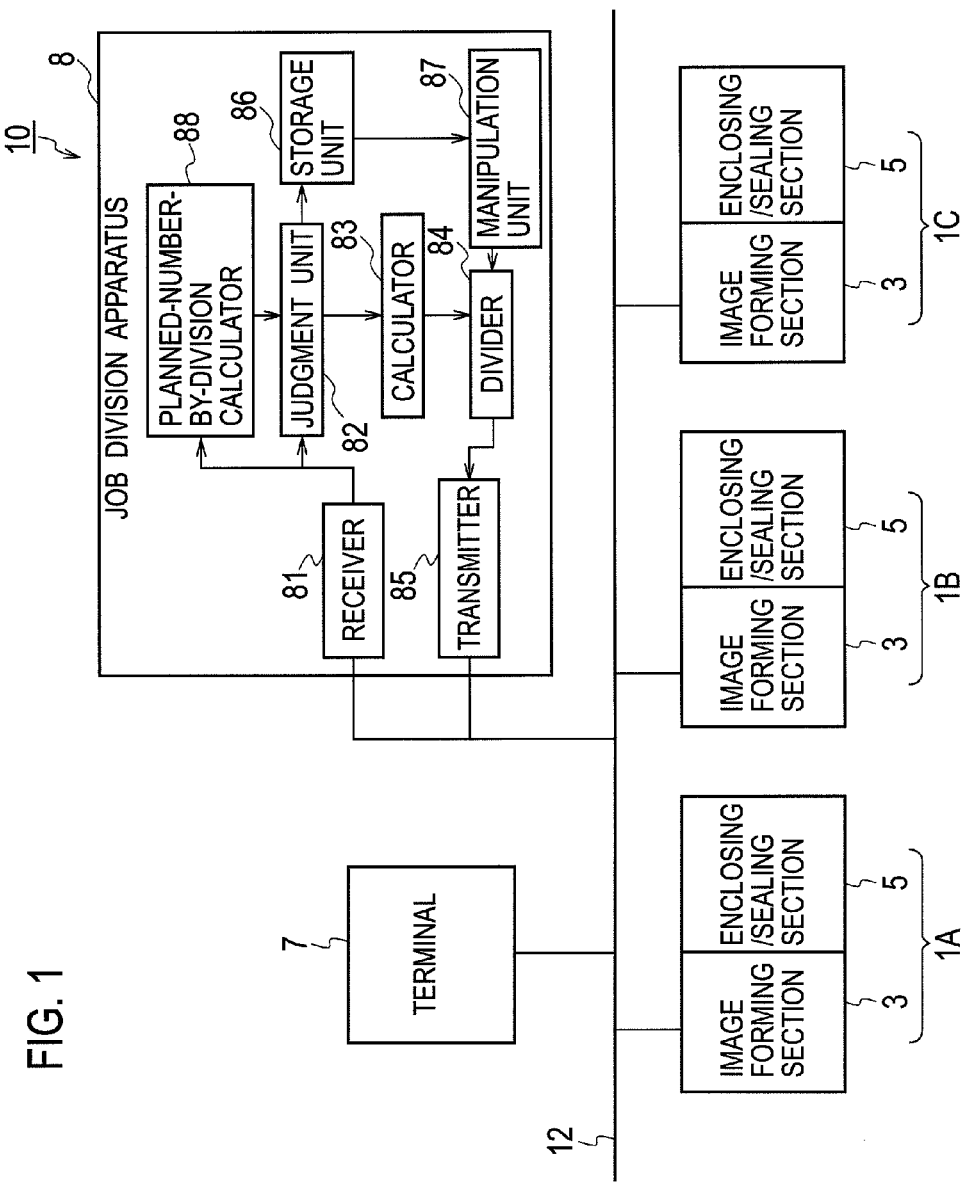
FIG. 1 is a block diagram of an image forming system of an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Detailed descriptions will be hereinbelow provided for an embodiment of the present invention by referring to the drawings.

As an example of the embodiment of the present invention, descriptions will be provided for an image forming system which includes: a terminal configured to generate a print job; a job division apparatus configured to divide the print job generated by the terminal into parts; and image forming apparatuses configured to perform printing on the basis of the divided parts of the print job.

<Constitution of Image Forming System>

FIG. 1 is a block diagram showing the constitution of the image forming system of an embodiment of the present invention.

As shown in FIG. 1, an image forming system 10 includes multiple image forming apparatuses 1A to 1C, a terminal 7, and a job division apparatus 8, which are all connected together through a network 9. Because the image forming apparatuses 1A to 1C have the same constitution, each of them is generically referred to as an image forming apparatus 1.

The terminal 7 is a personal computer, and generates a print job on the basis of the manipulation of the terminal 7 by the user.

The job division apparatus 8 includes a receiver 81, a judgment unit 82, a calculator 83, a divider 84, a transmitter 85, a storage unit 86 and a manipulation unit 87. A planned-number-by-division calculator 88 will be described later.

The receiver 81 receives a print job. In this respect, the print job includes multiple print sets which are units to be processed by the respective multiple image forming apparatuses 1. Detailed description will be provided for the print sets later.

The judgment unit 82 judges whether or not the print job can be divided on the basis of: a planned division position indicating a position at which the print job is planned to be divided; and a set separation position for the print sets included in the print job.

If the judgment unit 82 judges that the print job cannot be divided, the calculator 83 calculates a division position by moving a planned division position so that the planned division position can agree with the set separation position.

The divider 84 divides the print job on the basis of the division position calculated by the calculator 83.

The transmitter 85 transmits units into which the print job is divided by the divider 84, respectively, to the image forming apparatuses 1A to 1C in order that the print job can be processed by the image forming apparatuses 1A to 1C dispersedly.

The storage unit 86 stores the planned number of pages by division which is received from the manipulation unit 87. In this respect, assume that the planned number of pages by division is set at "3."

The manipulation unit 87 includes: an output unit like an organic electroluminescence display or a liquid crystal display; and input units such as a mouse. Once the planned number of pages by division is inputted by the user through the input units, the planned number of pages by division is stored in the storage unit 86.

<Constitution of Image Forming Apparatus>

Figure 3:
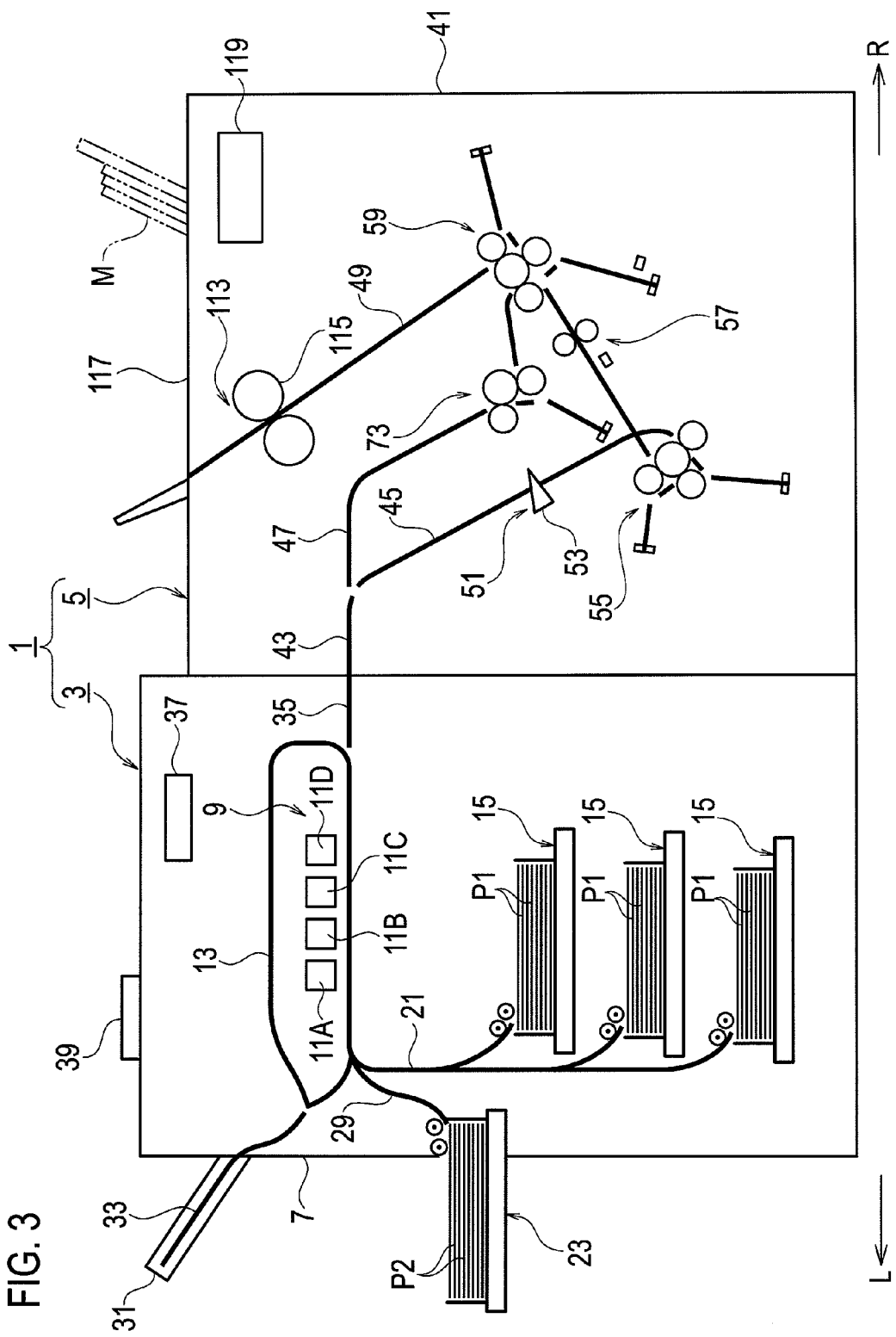
FIG. 3 is a schematic front view of the image forming apparatus of the image forming system of the embodiment of the present invention.

Description will be provided for the constitution of the image forming apparatus 1 of the image forming system 10 of the embodiment of the present invention. In the description, the "upstream" means the upstream in the direction in which content matter sheets and the like are conveyed, and the "downstream" means the downstream in the direction in which the content matter sheets and the like are conveyed. In FIG. 3, reference sign "L" means the left direction when viewed from the front, and reference sign "R" means the right direction when viewed from the front.

Figure 2:
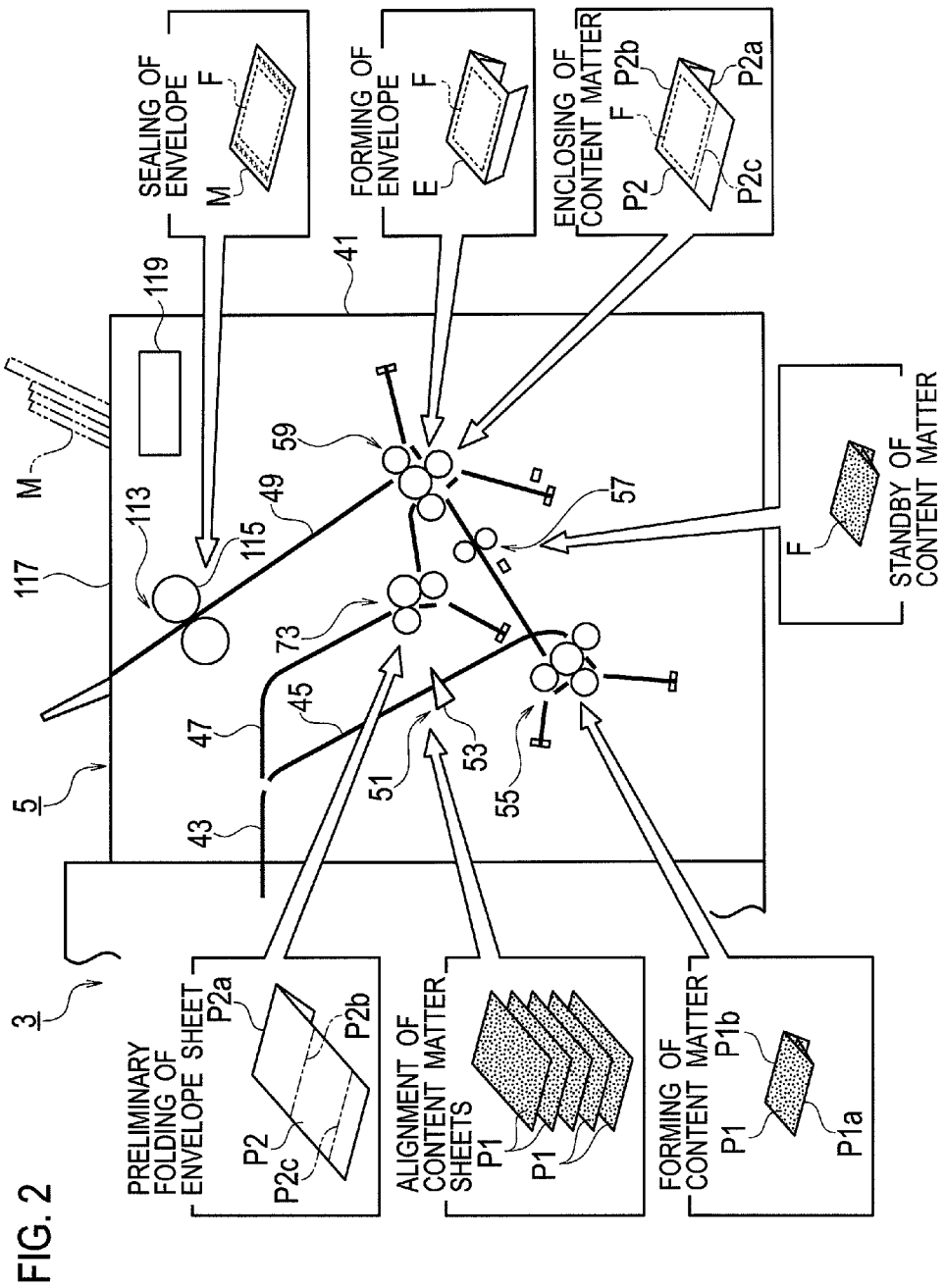

FIG. 2 is an explanatory diagram for explaining how the image forming apparatus 1 of the image forming system 10 of the embodiment of the present invention makes content matter sheets and the like. FIG. 3 is a schematic front view of the image forming apparatus 1 of the image forming system 10 of the embodiment of the present invention.

As shown in FIGS. 2 and 3, the image forming apparatus 1 of the embodiment of the present invention includes: an image forming section 3; and an enclosing/sealing section 5 which is adjacent downstream of the image forming section 3, and which is connected to the image forming section 3. The image forming section 3 performs printing on multiple content matter sheets P1 and/or multiple envelope sheets P2 as instructed by the user, and subsequently transfers the resultant content matter sheets P1 and/or the resultant envelope sheets P2 to the adjacent enclosing/sealing section 5. As shown in FIG. 2, the enclosing/sealing section 5 makes content matters F and envelopes E, respectively, from the multiple printed content matter sheets P1 and the multiple printed envelope sheets P2 which the enclosing/sealing section 5 receives from the image forming section 3. In a case where the content matters F are present, the enclosing/sealing section 5 seals the envelopes E with the content matters F enclosed in the envelops E, respectively. Thereby, the enclosing/sealing section 5 makes sealed letters M. In this respect, in some cases, the sealed letters M are made from only the envelopes E with no content matters F included in the respective envelopes E, as described above. In these cases, an equivalent of the content to be printed on the content matters F is printed on the back of each envelope E.

An inkjet-type printing unit 9 configured to perform printing on the content matter sheets P1 and the envelope sheets P2 is provided inside the housing of the image forming section 3. The printing unit 9 includes multiple line-type ink heads 11A, 11B, 11C, 11D configured to eject black, cyan, magenta and yellow inks, respectively. A loop-shaped print conveyance path 13 configured to convey the content matter sheets P1 and the envelope sheets P2 is provided in a way that makes the print conveyance path 13 surround the printing unit 9.

Under the printing unit 9 inside the housing of the image forming section 3, multiple content matter sheet feeders 15 configured to sequentially feed the multiple content matter sheets P1 to the printing unit 9 (to the print conveyance path 13) are provided, stacked one on another in the vertical direction.

A paper-feeding conveyance path 21 configured to convey the content matter sheets P1 to the printing unit 9 is provided to the left portion of the inside of the housing of the image forming section 3. The paper-feeding conveyance path 21 conveys the content matter sheets P1 which are fed from the multiple content matter sheet feeders 15.

An envelope sheet feeder 23 configured to feed the envelope sheet P2 to the printing unit 9 (to the print conveyance path 13) is provided to the left side portion of the inside of the housing of the image forming section 3.

A paper-feeding conveyance path 29 configured to convey the envelope sheets P2 to the printing unit 9 is provided to the left portion of the inside of the housing of the image forming section 3. The paper-feeding conveyance path 29 conveys the envelope sheets P2 which are fed from the envelope sheet feeder 23.

A cassette 31 configured to temporarily contain the content matter sheets P1 and the envelope sheets P2 is provided above and to the left of the print conveyance path 13. A switch-back conveyance path 33 configured to turn the content matter sheets P1 and the envelope sheets P2 upside down, as well as to convey the resultant content matter sheets P1 and the resultant envelope sheets P2 to the printing unit 9, is provided extending from the left portion of the inside of the housing of the image forming section 3 to the inside of the cassette 31.

A connecting conveyance path 35 configured to convey the content matter sheets P1 and the envelope sheets P2, which are sent out by the print conveyance path 13, to the enclosing/sealing section 5 (rightwards) is provided to the right portion of the inside of the image forming section 3.

An image formation controller 37 is provided in an appropriate position inside the housing of the image forming section 3. The image formation controller 37 controls the printing unit 9, the content matter sheet feeders 15, the envelope sheet feeder 23, an operation panel 39 and the like.

As shown in FIGS. 1 and 2, the enclosing/sealing section 5 in the image forming apparatus 1 includes an enclosing/sealing section housing 41 (hereinafter referred to as an "apparatus housing 41" depending on the necessity). An introduction conveyance path 43 configured to convey the printed content matter sheets P1 and the printed envelope sheets P2 rightwards, which are sent out from the communicating conveyance path 35 (the image forming section 3) is provided inside the apparatus housing 41.

A content matter sheet conveyance path 45 configured to convey the printed content matter sheets P1 and the like (including the content matters F) is provided inside the apparatus housing 41. An envelope sheet conveyance path 47 configured to convey the printed envelope sheets P2 is provided above the content matter sheet conveyance path 45 inside the apparatus housing 41.

The downstream end of the content matter sheet conveyance path 45 and the downstream end of the envelope sheet conveyance path 47 flow together in an envelope forming unit 59. An envelope conveyance path 49 configured to convey the envelopes E and the like (including the sealed letters M) with the content matters F enclosed in the respective envelopes E is provided in an downstream-side portion (an exit-side portion) of the confluence between the content matter sheet conveyance path 45 and the envelope sheet conveyance path 47 inside the apparatus housing 41. The envelope conveyance path 49 extends to the upper portion of the apparatus housing 41.

An alignment unit 51 is provided in the middle of the content matter sheet conveyance path 45. The alignment unit 51 accumulates and aligns multiple printed content matter sheets P1 which are sent out from the introduction conveyance path 43.

A content matter forming unit 55 is provided to a portion of the content matter sheet conveyance path 45 which is closer to the exit of the alignment unit 51. The content matter forming unit 55 forms the content matters F by folding the multiple aligned content matter sheets P1 (hereinafter referred to as "content matter sheets P1" depending on the necessity) which are sent out from the alignment unit 51.

A preliminary folder 73 is provided in the middle of the envelope sheet conveyance path 47. The preliminary folder 73 preliminarily folds the printed envelope sheets P2 (hereinafter referred to as "envelope sheets P2" depending on the necessity) which are sent out from the communicating conveyance path 35.

The envelope forming unit 59 is provided to the confluence between the content matter sheet conveyance path 45 and the envelope sheet conveyance path 47. The envelope forming unit 59 forms the envelopes E by folding the envelope sheets P2 which are sent out from the preliminary folder 73.

A content matter sender 57 is provided in a middle portion of the content matter sheet conveyance path 45 which is closer to an entrance (an upstream portion) of the envelope forming unit 59. The content matter sender 57 sends the content matters F, which are sent out from the content matter forming unit 55, to the envelope forming unit 59 in a way that encloses the content matters F into the respective envelope sheets P2 which are being folded along a folding line P2b.

A sealing unit 113 is provided in the middle of the envelope conveyance path 49. The sealing unit 113 seals the envelopes E which are sent out from the envelope forming unit 59. The sealing unit 113 includes paired sealing rollers 115 which are configured to press each envelope E while the envelope E is held between the paired sealing rollers 115. The paired sealing rollers 115 are rotatable by being driven by an appropriate sealing motor (whose illustration is omitted). Each envelope E is designed to be sealed due to the adhesive action of a pressure-sensitive adhesive agent and/or a liquid glue which is beforehand applied to the envelope sheet P2, when the envelope E is held and pressed by the paired sealing rollers 115.

A sealed letter discharge unit 117 to which the sealed letters M, normally sealed and sent out from the envelope conveyance path 49, are discharged is provided in the downstream portion of the envelope conveyance path 49.

In this manner, the image forming section 3 performs printing on the multiple content matter sheets P1 and the multiple envelope sheets P2, as well as the enclosing/sealing section 5 makes the sealed letters M by: forming the content matters F and the envelopes E from the multiple printed content matter sheets P1 and the multiple printed envelope sheets P2 which are conveyed from the image forming section 3; and sealing the envelopes E with the content matters F enclosed in the respective envelopes E.

For this reason, the combination of the content matter sheets P1 and the envelope sheets P2 is treated as one print set. Each print set needs to be subjected to the printing process and the enclosing/sealing process by the same image forming apparatus 1.

To this end, as described above, when the print job includes multiple print sets, the image forming system 10 of the embodiment of the present invention appropriately divides the print job so that every image forming apparatus can perform the printing process and the enclosing/sealing process for each print set.

The image forming apparatus 1 of the image forming system 10 of the embodiment of the present invention is applicable to any sheet size. The following embodiment is carried out by, for example, a stencil printing method and an inkjet printing method. However, the following embodiment may be carried out by other printing methods. The present invention does not impose any specific restriction on what printing method should be employed. Furthermore, no specific restriction is imposed on how many types of printed matters can be sealed (and how many copies of each printed matter can be sealed).

<Working of Image Forming System>

Next, descriptions will be provided for how the image forming system 10 of the embodiment of the present invention works.

Figure 4:
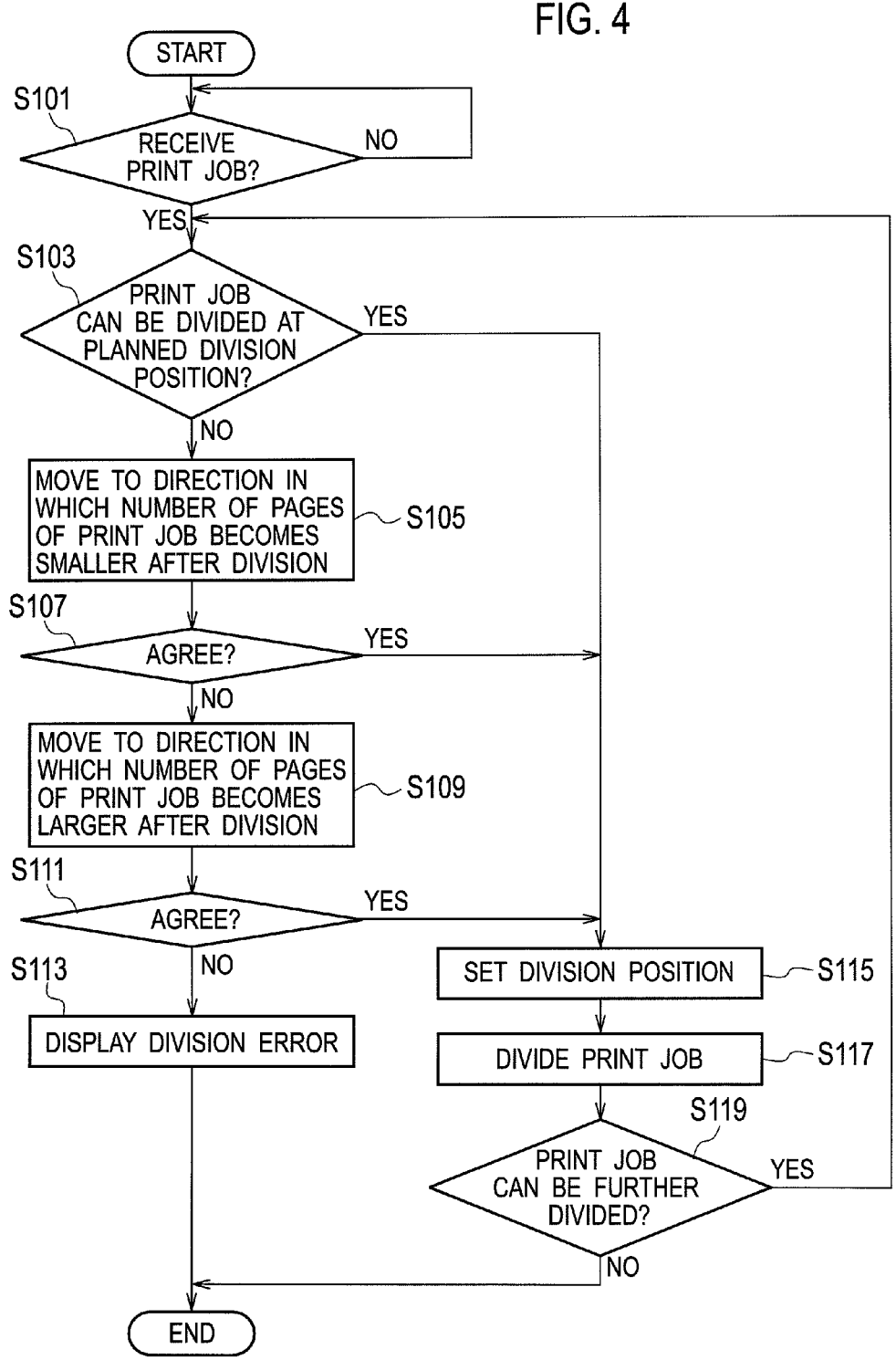
FIG. 4 is a flowchart showing a procedure in which a job division apparatus of the image forming system of the embodiment of the present invention performs a division process.

FIG. 4 is a flowchart showing a procedure in which the job division apparatus 8 of the image forming system 10 of the embodiment of the present invention performs a division process.

As shown in FIG. 4, once the receiver 81 of the job division apparatus 8 receives the print job (in step S101), the judgment unit 82 judges whether or not the print job can be divided at the planned division position (in step S103). To put it specifically, the judgment unit 82 calculates the planned division position on the basis of the predetermined planned number of pages by division which is stored in the storage unit 86. If the calculated planned division position agrees with the set separation position for the print sets which are included in the received print job, the judgment unit 82 judges that the print job can be divided at the planned division position.

FIGS. 5(a) to 5(f) are diagrams for schematically explaining the procedure in which the job division apparatus 8 of the image forming system 10 of the embodiment of the present invention performs the division process.

FIG. 5(a) shows the print job which is received from the terminal 7. In this respect, three print sets A, B, C are included in the print job. The print set A includes: pieces of image data A1 for performing printing on the content matter sheets P1; and a piece of image data A2 for performing printing on the envelope sheets P2. Similarly, the print set B includes pieces of image data B1 and a piece of image data B2, as well as the print set C includes pieces of image data C1 and a piece of image data C2.

In this case, the set separation positions are positions denoted by reference sings 101, 102, 103, because the set separation positions are those which make each combination of the content matter sheets P1 with the envelope sheets P2 treated as one print set.

FIG. 5(b) shows predetermined planned division positions.

In this respect, as shown in FIG. 5(b), the planned number of pages by division is set at "3." For this reason, the planned division positions are positions denoted by reference signs 201, 202, 203, at which the print job is divided by every three pages.

If the print job shown in FIG. 5(a) is received in step S103, the judgment unit 82 judges that the print job can be divided at the planned division positions, because the planned division positions shown in FIG. 5(b) agree with the set separation positions shown in FIG. 5(a).

In this manner, if the planned division position agrees with the set separation position, the judgment unit 82 judges that the print job can be divided at the planned division position because the image forming apparatus 1 can perform the printing process and the enclosing/sealing process for each print set.

On the other hand, if the planned division position does not agree with the set separation position, the judgment unit 82 judges that the print job cannot be divided at the planned division position.

FIG. 5(c) is a diagram showing planned division positions and set separation positions.

In this respect, as shown in FIG. 5(c), the planned division positions are positions denoted by reference signs 201, 202, because the planned number of pages by division is set at "3."

Meanwhile, the print job shown in FIG. 5(c) includes: a print set A made from three pieces of image data A1, A2; a print set B made from two pieces of image data B1, B2; and a print set C made from three pieces of image data C1, C2.

The set separation positions are positions denoted by reference signs 301, 302, 303, because the set separation positions are those which make each combination of the content matter sheets P1 with the envelope sheets P2 treated as one print set.

If the print job shown in FIG. 5(c) is received in step S103, the judgment unit 82 judges that the print job cannot be divided at the planned division positions because the planned division positions shown in FIG. 5(b) do not agree with the set separation positions shown in FIG. 5(c).

In this manner, if the planned division positions do not agree with the set separation positions, the judgment unit 82 judges that the print job cannot be divided at the planned division positions.

If it is judged that the print job cannot be divided at the planned division position (if NO) in step S103, the calculator 83 moves a planned division position, which does not agree with the set separation position, forwards so that the planned division position can agree with the set separation division (in step S105).

FIG. 5(d) is a diagram for explaining how the planned division position is moved forwards. In this respect, the term "forwards" means towards the top in the order in which images included in the print job are arranged in relation to each other (forwards in the order). The term "backwards" means towards the last in the order in which the images included in the print job are arranged in relation to each other (backwards in the order). In FIGS. 5(a) to 5(f), leftwards represents forwards, and rightwards represents backwards.

As shown in FIG. 5(d), because the planned division position 202 does not agree with the set separation position 302, the calculator 83 calculates a new planned division position 402 by moving the planned division position 202 forwards so that the planned division position 202 can agree with the set separation position 302.

Subsequently, the calculator 83 judges whether or not the planned division position agree with the set separation position (in step S107).

If it is judged that the planned division position agree with the set separation position (if YES) in step 107, the calculator 83 sets division position (in step S115), and the divider 84 divides the print job on the basis of the division position which is set by the calculator 83 (in step S117).

Subsequently, the judgment unit 82 judges whether or not the print job can be further divided (in step S119). If the print job cannot be divided any more, the judgment unit 82 terminates the process.

On the other hand, if it is judged that the planned division position still does not agree with the set separation position (if NO) in step S107, the calculator 83 moves the planned division position backwards so that the planned division position can agree with the set separation division (in step S109).

FIG. 5(e) shows the planned division positions and set separation positions. FIG. 5(f) is a diagram for explaining how a planned division position is moved backwards.

In this respect, as shown in FIG. 5(e), the planned division positions are positions denoted by reference signs 201, 202, because the planned number of pages by division is set at "3."

Meanwhile, the print job shown in FIG. 5(e) includes: the print set A made from three pieces of image data A1, A2; the print set B made from four pieces of image data B1, B2; and the print set C made from two pieces of image data C1, C2.

The set separation positions are positions denoted by reference signs 501, 502, because the set separation positions are those which make each combination of the content matter sheets P1 and the envelope sheets P2 treated as one print set.

If the print job shown in FIG. 5(e) is received in step S101, the judgment unit 82 judges that the print job cannot be divided at the planned division position because the planned division position does not agree with the set separation position (in step 103). Subsequently, although the planned division position 202 is moved forwards (in step S105), the planned division position 202 still does not agree with the set separation position 502. For this reason, the calculator 83 judges in step S107 that the planned division position still does not agree with the set separation position. Thereafter, as shown in FIG. 5(f), the calculator 83 calculates a new planned division position 602 by moving the planned division position 202 backwards so that the planned division position 202 can agree with the set separation position 502.

Subsequently, the calculator 83 judges whether or not the planned division position agrees with the set separation position (in step S111).

If it is judged that the planned division position agrees with the set separation position (if YES) in step 111, the calculator 83 sets division position (in step S115), and the divider 84 divides the print job on the basis of the division position which is set by the calculator 83 (in step S117).

On the hand, if it is judged that the planned division position does not agree with the set separation position (if NO) in step 111, the divider 84 causes the manipulation unit 87 to display the error (in step S113).

As described above, the image forming system 10 of the embodiment of the present invention is capable of appropriately dividing the print job for each image forming apparatus 1, because the image forming system 10 includes: the judgment unit 82 configured to judge whether or not the print job can be divided on the basis of the planned division position indicating the position at which the print job is planned to be divided and the set separation position for the print sets included in the received print job; the calculator 83 configured to calculate the division position by moving the planned division position so that the planned division position can agree with the set separation position, if the judgment unit 82 judges that the print job cannot be divided; and the divider 84 configured to divide the print job on the basis of the division position which is calculated by the calculator 83.

In the image forming system 10 of the embodiment of the present invention, the planned division position is calculated on the basis of the planned number of pages by division which is received from the input unit and is stored in the storage unit 86. However, the present invention is not limited to this. The image forming system 10 may further include a planned-number-by-division calculator 88 configured: to calculate a planned number by division, which is a number obtained by dividing the total number of pages by the number of image forming apparatuses 1 connected, on the basis of the print job; and to calculate the planned division position on the basis of this planned number by division.

For example, in a case where the image forming system 10 includes the three image forming apparatuses 1A to 1C and the print job has "900" pages in total, the planned-number-by-division calculator 88 calculates the planned number by division as 300, and calculates positions corresponding to the 300th and 600th pages as the planned division position by separating the print job by every 300 pages from the top of the print job.

Subsequently, the judgment unit 82 judges whether or not the print job can be divided by using the planned division position which is calculated by the planned-number-by-division calculator 88. If the judgment unit 82 judges that the print job cannot be divided, the calculator 83 calculates a division position by moving a planned division position so that the planned division position calculated by the planned-number-by-division calculator 88 can agree with the set separation position.

Thereby, the job can be appropriately divided without the user having to set the planned number by division.

Furthermore, the productivity of each of the multiple connected image forming apparatuses 1 may be taken into consideration when the division position is decided. In this respect, the productivity means a value which can be calculated from things such as: the number of printed sheets which each image forming section 3 is capable of producing through the print process per unit time; and the number of envelopes which each enclosing/sealing section 5 is capable of producing through the enclosing/sealing process per unit time. The productivity is inherent to each image forming apparatus 1. When the productivity is taken into consideration, the print job can be more efficiently processed by the multiple image forming apparatuses 1 dispersedly. Accordingly, a higher dispersion effect can be obtained.

In the image forming system 10 of the embodiment of the present invention, the planned number of pages by division, which is inputted from the input unit of the manipulation unit 87, is stored in the storage unit 86. However, the present invention is not limited to this, and may be achieved by: inputting the planned number of pages by division through the user's manipulation of the terminal 7; receiving the planned number of pages by division via the network 9; and storing the received planned number of pages by division in the storage unit 86.

In the image forming system 10 of the embodiment of the present invention, the print job received from the terminal 7 is divided. However, the present invention is not limited to this. The print job may be generated inside the job division apparatus.

The three image forming apparatuses 1A to 1C included in the image forming system 10 of the embodiment of the present invention have been described by giving the inkjet line color printer, which is configured to perform printing for each line, as their example. However, the present invention is not limited to this, and may be a serial inkjet printer, a laser printer, or a stencil printer.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A job division apparatus connected to a plurality of image forming apparatuses, configured to divide a print job including a plurality of print sets which are units to be processed by the plurality of respective image forming apparatuses, and configured to transmit the print sets to the plurality of respective image forming apparatuses, the job division apparatus comprising:
a judgment unit configured to judge whether the print job is dividable at a planned division position indicating a position at which the print job is planned to be divided, on a basis of the planned division position and a set separation position for the print sets included in the print job, wherein the judgment unit is configured to judge that the print job is dividable at the planned division position upon agreement between the planned division position and the set separation position, and judge that the print job is not dividable at the planned division position upon disagreement between the planned division position and the set separation position;
a calculator configured to calculate a division position by moving the planned division position so as to agree with the set separation position upon judgment by the judgment unit that the print job is not dividable at the planned division position; and
a divider configured to divide the print job on a basis of the division position as calculated by the calculator.

2. The job division apparatus according to claim 1, further comprising a planned-number-by division calculator configured to calculate the planned division position on a basis of a planned number by division obtained by dividing a total number of pages included in the print job by a number of image forming apparatuses connected to the job division apparatus.

3. The job division apparatus according to claim 1, wherein the calculator is configured to, upon judgment by the judgment unit that the print job is not dividable at the planned division position,
calculate a new planned division position by moving the planned division position so as to agree with the set separation position, and judge whether the new planned division position as calculated agrees with the set separation position,
upon agreement between the new planned division position and the set separation position, set the new planned division position as the division position, and
the divider is configured to divide the print job on a basis of the division position as set by the calculator.

4. The job division apparatus according to claim 1, wherein the calculator is configured to, upon judgment by the judgment unit that the print job is not dividable at the planned division position,
calculate a first new planned division position by moving the planned division position so as to agree with the set separation position, and judge whether the first new planned division position as calculated agrees with the set separation position, and
upon disagreement between the first new planned division position and the set separation position, calculate a second new planned division position by moving the planned division position so as to agree with the set separation position.

5. The job division apparatus according to claim 4, wherein the calculator is configured to set the second new planned division position as the division position upon agreement between the second new planned division position and the set separation position, and
the divider is configured to divide the print job on a basis of the division position as set by the calculator.

6. The job division apparatus according to claim 4, wherein the calculator is configured to calculate the first new planned division position by moving the planned division position towards a top in an order in which images included in the print job are arranged in relation to each other, and calculate the second new planned division position by moving the planned division position towards a last in the order in which the images included in the print job are arranged in relation to each other.

* * * * *